(12) United States Patent
Benisty (10) Patent No.: US 12,105,990 B2
(45) Date of Patent: Oct. 1, 2024

(54) PARALLEL FRAGMENTED SGL FETCHING FOR HIDING HOST TURNAROUND TIME

(71) Applicant: Western Digital Technologies, Inc., San Jose, CA (US)

(72) Inventor: Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 17/943,767

(22) Filed: Sep. 13, 2022

(65) Prior Publication Data

US 2024/0086108 A1 Mar. 14, 2024

(51) Int. Cl.
*G06F 3/06* (2006.01)

(52) U.S. Cl.
CPC .......... *G06F 3/0659* (2013.01); *G06F 3/0613* (2013.01); *G06F 3/0652* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 9,110,786 B2 | 8/2015 | Carlson et al. | |
| 9,990,138 B2 | 6/2018 | Halaharivi | |
| 10,095,433 B1* | 10/2018 | Gao | G06F 3/0659 |
| 10,108,565 B2 | 10/2018 | Olcay et al. | |
| 10,282,132 B2 | 5/2019 | A et al. | |
| 10,657,087 B2 | 5/2020 | Tomlin | |
| 11,861,224 B2 | 1/2024 | Benisty | |
| 2017/0285940 A1* | 10/2017 | Benisty | G06F 12/0871 |
| 2019/0370199 A1* | 12/2019 | Tomlin | G06F 3/0673 |
| 2022/0035530 A1 | 2/2022 | Vikram Singh | |
| 2023/0128954 A1 | 4/2023 | Benisty | |

* cited by examiner

*Primary Examiner* — Charles J Choi
(74) *Attorney, Agent, or Firm* — PATTERSON + SHERIDAN, LLP (57) ABSTRACT

The present disclosure generally relates to reducing latency when fetching Scatter Gather Lists (SGL). Rather than fetching the required SGLs sequentially regardless of what SGL descriptor is needed, the data storage device fetches all of the last entries of each SGL segment in ahead of time after receiving the command, but before the read data is available. The data storage device will still fetch the previous entries in the segment. Once the last entries are fetched, the last entries are stored in a table where the earlier descriptors of each segment are stored as the segments are fetched. In so doing, parallel fetching allows the data storage device to fetch SGL descriptors as needed and reduces the latency.

20 Claims, 10 Drawing Sheets

| Segment Index | Segment Pointer | Byte Count (when avail) | Byte Count Transferred |
|---|---|---|---|
| 0 | PTR0 | BC0 | Trans_BC0 |
| 1 | PTR1 | BC1 | Trans_BC1 |
| 2 | PTR2 | BC2 | Trans_BC2 |
| ... | ... | ... | ... |

Command ID →

PARALLEL FRAGMENTED SGL FETCHING FOR HIDING HOST TURNAROUND TIME

BACKGROUND OF THE DISCLOSURE

Field of the Disclosure

Embodiments of the present disclosure generally relate to reducing latency when fetching Scatter Gather Lists (SGL).

Description of the Related Art

Nonvolatile memory express (NVMe) is an interface protocol for a host device and a data storage device, such as a solid state drive (SSD), based on a paired submission and completion queue mechanism. Commands are placed by host software into a submission queue. Completions are placed into a completion queue by a controller of the data storage device. Submission and completion queues are allocated in a memory of a host device.

The physical memory locations in host memory which are used for data transfers are specified using physical region page (PRP) entries or scatter gather list (SGL) entries. The PRP method assumes that each host buffer has the same fixed size other than the first buffer.

On the other hand, SLG methods do not assume anything about the size of the host buffers. Generally, each buffer may have any size. Each buffer is described by a dedicated SGL data block descriptor in which the address and the size of the buffer are specified. The SGL is a more advanced method for describing host buffers while not taking any assumption.

The NVMe standard defines a few types of SGL descriptors. The most basic descriptor is the SGL data block descriptor which describes a single host buffer. The SGL descriptors may be stored non-continuously in the host memory. Each bunch of SGL descriptors is defined as an SGL segment and described by an SGL segment descriptor.

While SGL is a more generic method that provides full flexibility, PRP is a sub-set of that while having few assumptions. However, the PRP method is more adjusted to SSDs and to out of order transfers supported by the NVMe standard. In a typical workload, PRPs and SGLs are mixed, and not all SGLs are equal.

SGLs are always fetched in order even when data transfer is out of order. The in order fetching is due to the nature of the SGL definition and the complexity involved in out-of-order transfers. The main drawback of the approach is the performance degradation faced when having fragmented SGL. When having multiple segments, the data storage device fetches the required SGLs sequentially. In this scenario, the latency for SGL fetching is higher since the next SGL transfer cannot start until getting the previous one, which will lead to performance degradation.

Stated another way, SGLs sequentially fetched involves all data being fetched in order even before the data that is required. Sequentially fetching leads to latency issues because a required SGL descriptor is not immediately fetched from the SGL segment when needed, but fetched in the order of what SGL segment the SGL descriptor is in.

Therefore, there is a need in the art for reducing SGL fetching latency by having parallel fetching from multiple segments.

SUMMARY OF THE DISCLOSURE

The present disclosure generally relates to reducing latency when fetching Scatter Gather Lists (SGL). Rather than fetching the required SGLs sequentially regardless of what SGL descriptor is needed, the data storage device fetches all of the last entries of each SGL segment in ahead of time after receiving the command, but before the read data is available. The data storage device will still fetch the previous entries in the segment. Once the last entries are fetched, the last entries are stored in a table where the earlier descriptors of each segment are stored as the segments are fetched. In so doing, parallel fetching allows the data storage device to fetch SGL descriptors as needed and reduces the latency.

In one embodiment, a data storage device comprises: a memory device; and a controller coupled to the memory device, wherein the controller is configured to: receive a command, wherein the command comprises a scatter-gather list (SGL), wherein the SGL includes at least two segments, and wherein the at least two segments each includes a plurality of entries; and retrieve a last entry of the plurality of entries the at least two segments, wherein the last entry is retrieved prior to retrieval of at least one other entry of the plurality of entries.

In another embodiment, a data storage device comprises: a memory device; and a controller coupled to the memory device, wherein the controller includes: receiving an internal request for scatter-gather list (SGL) fetching; determine that there are crossing SGL segments; and parallel fetch data for crossing SGL segments.

In another embodiment, a data storage device comprises: memory means; and a controller coupled to the memory means, wherein the controller is configured to: fetch scatter-gather list (SGL) entries out of order from SGL segments in an SGL list; and fetch data associated with the SGL entries in parallel.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to reducing latency when fetching Scatter Gather Lists (SGL). Rather than fetching the required SGLs sequentially regardless of what SGL descriptor is needed, the data storage device fetches all of the last entries of each SGL segment in ahead of time after receiving the command, but before the read data is available. The data storage device will still fetch the previous entries in the segment. Once the last entries are fetched, the last entries are stored in a table where the earlier descriptors of each segment are stored as the segments are fetched. In so doing, parallel fetching allows the data storage device to fetch SGL descriptors as needed and reduces the latency.

Figure 1:
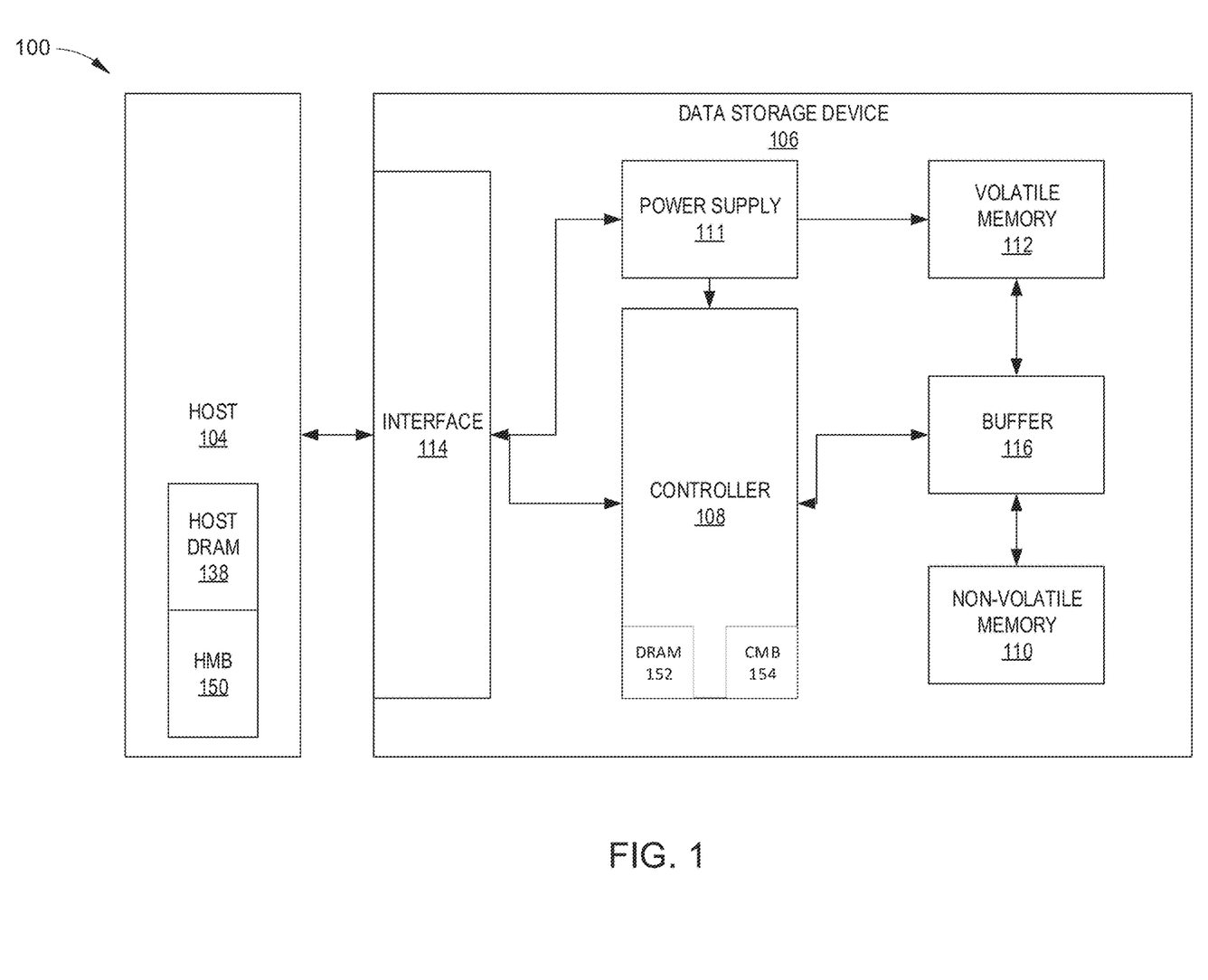
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
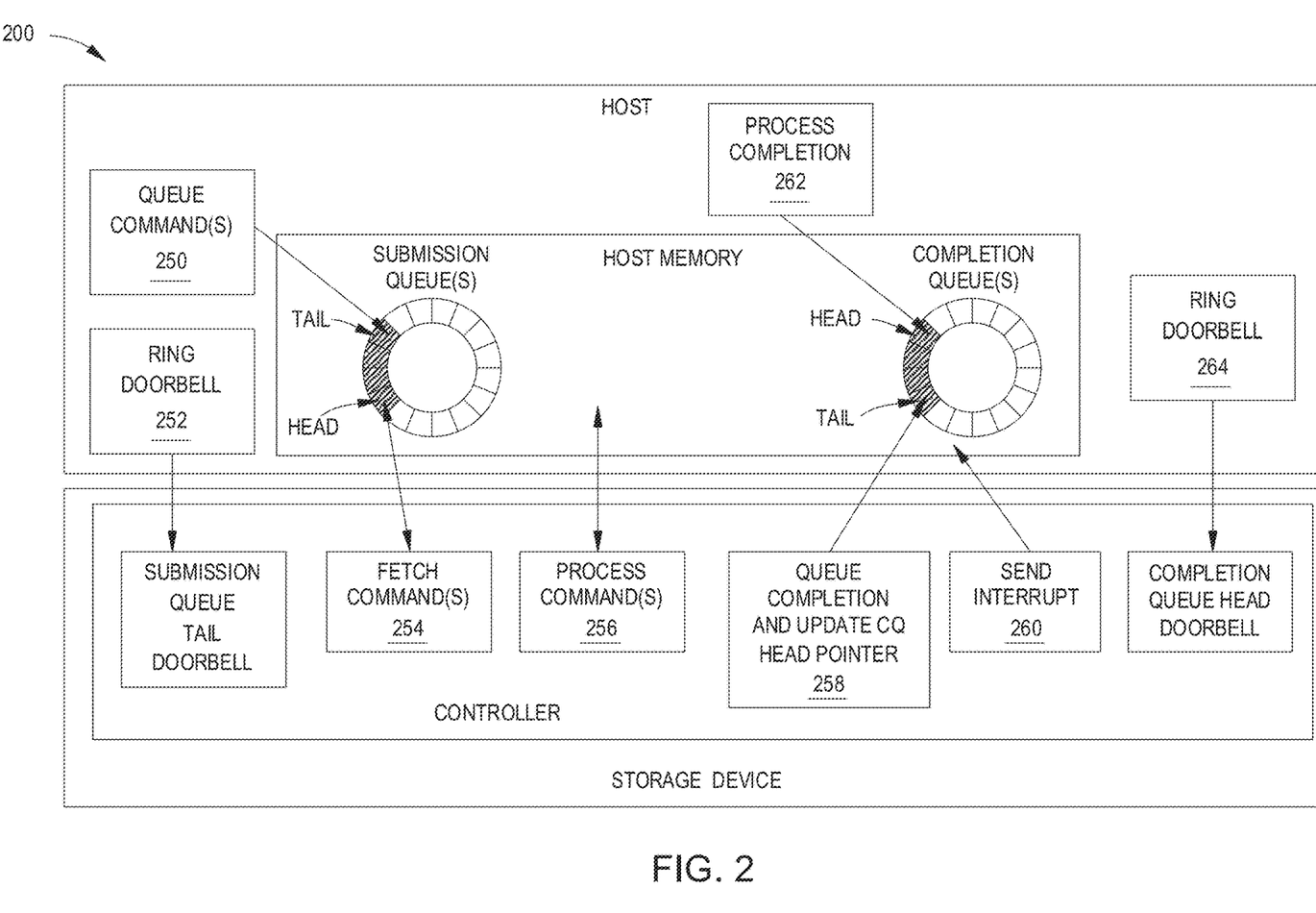
FIG. 2 is a block diagram illustrating a method of operating a storage device to execute a read or write command, according to one embodiment.

FIG. 2 is a block diagram illustrating a method 200 of operating a storage device to execute a read, write, or compare command, according to one embodiment. Method 200 may be used with the storage system 100 having a host device 104 and a data storage device 106 comprising a controller 108. Method 200 may be used with the device a host device and a data storage device comprising a command processor.

Method 200 begins at operation 250, where the host device writes a command into a submission queue as an entry. The host device may write one or more commands into the submission queue at operation 250. The commands may be read commands or write commands or compare commands. The host device may comprise one or more submission queues. The host device may write one or more commands to the submission queue in any order (i.e., a submission order), regardless of the sequential write order of the one or more commands (i.e., a sequential processing order).

In operation 252, the host device writes one or more updated submission queue tail pointers and rings a doorbell or sends an interrupt signal to notify or signal the storage device of the new command that is ready to be executed. The host may write an updated submission queue tail pointer and send a doorbell or interrupt signal for each of the submission queues if there are more than one submission queues. In operation 254, in response to receiving the doorbell or interrupt signal, a controller of the storage device fetches the command from the one or more submission queue, and the controller receives or DMA reads the command.

In operation 256, the controller processes the command and writes, transfers data associated with a read command to the host device memory, or retrieves data for a compare command. The controller may process more than one command at a time. The controller may process one or more commands in the submission order or in the sequential order. Processing a write command may comprise identifying a stream to write the data associated with the command to and writing the data to one or more logical block address (LBA) of the stream.

In operation 258, once the command has been fully processed, the controller writes a completion entry corresponding to the executed command to a completion queue of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 3:
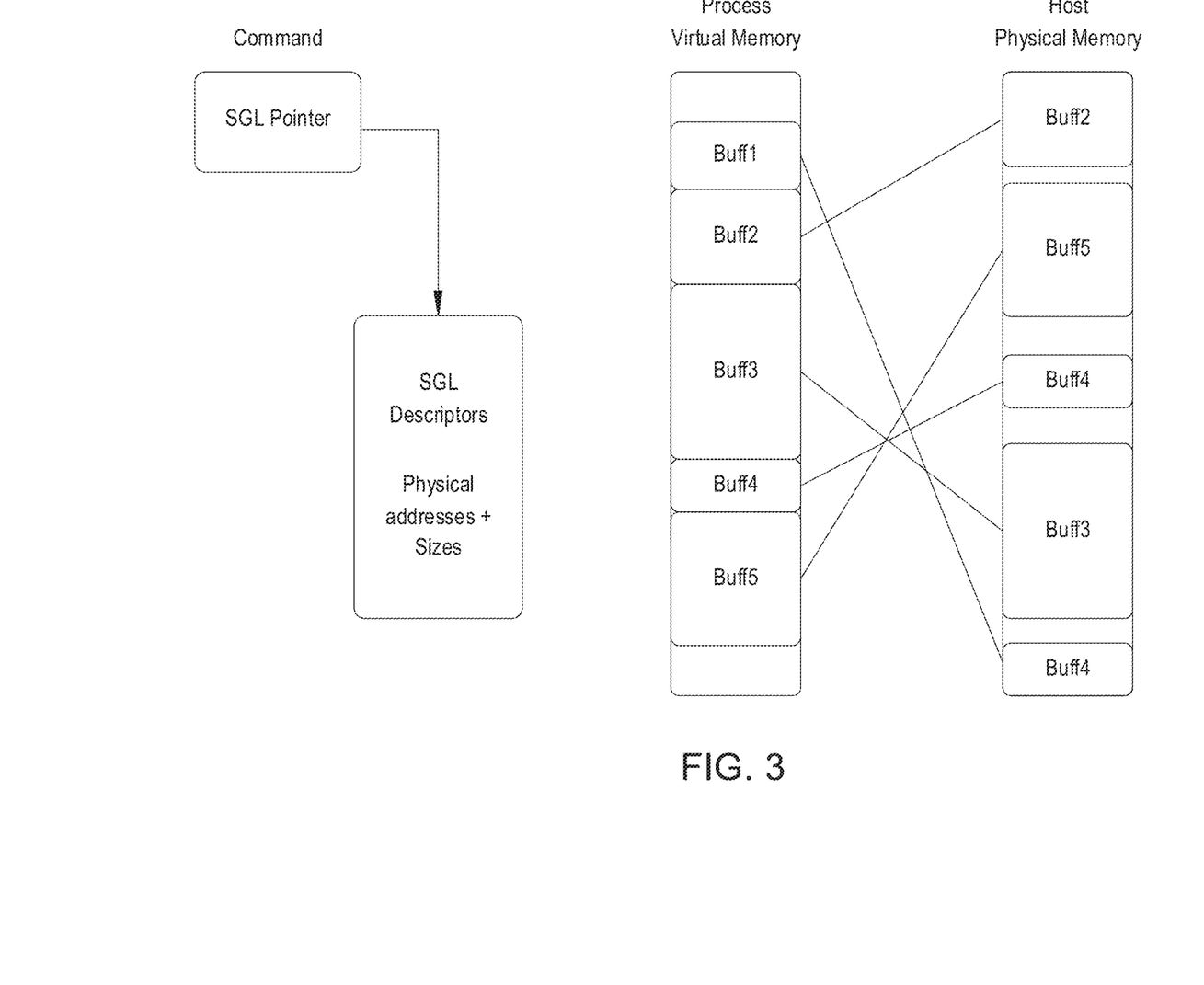
FIG. 3 is a schematic illustration of host buffers using scatter gather lists (SGL) entries according to one embodiment.

FIG. 3 is a schematic illustration of host buffers using scatter gather lists (SGL) entries according to one embodiment. When using SGL entries, there is no assumption about the size of the host buffers, in contrast to PRP entries.

Generally, each host buffer may have any size, as illustrated in FIG. 3. Each host buffer is described by a dedicated SGL data block descriptor in which the address and the size of the host buffer are specified. The SGL is a more advanced method for describing host buffers while not making any assumptions. As shown in FIG. 3, the SGL pointer points to SGL descriptors that includes the physical addresses and sizes of the host buffers. The host buffers are in the host physical memory, with each host buffer having a different size as illustrated in FIG. 3. The host buffers in the host physical memory correspond to host buffers that are disposed in the process virtual memory.

The NVMe standard defines a few types of SGL descriptors. The most basic descriptor is the SGL data block descriptor which describes a single host buffer. The SGL descriptors may be stored non-continuously in the host memory. Each bunch of SGL descriptors is defined as a SGL segment and described by an SGL segment descriptor.

Figure 4:
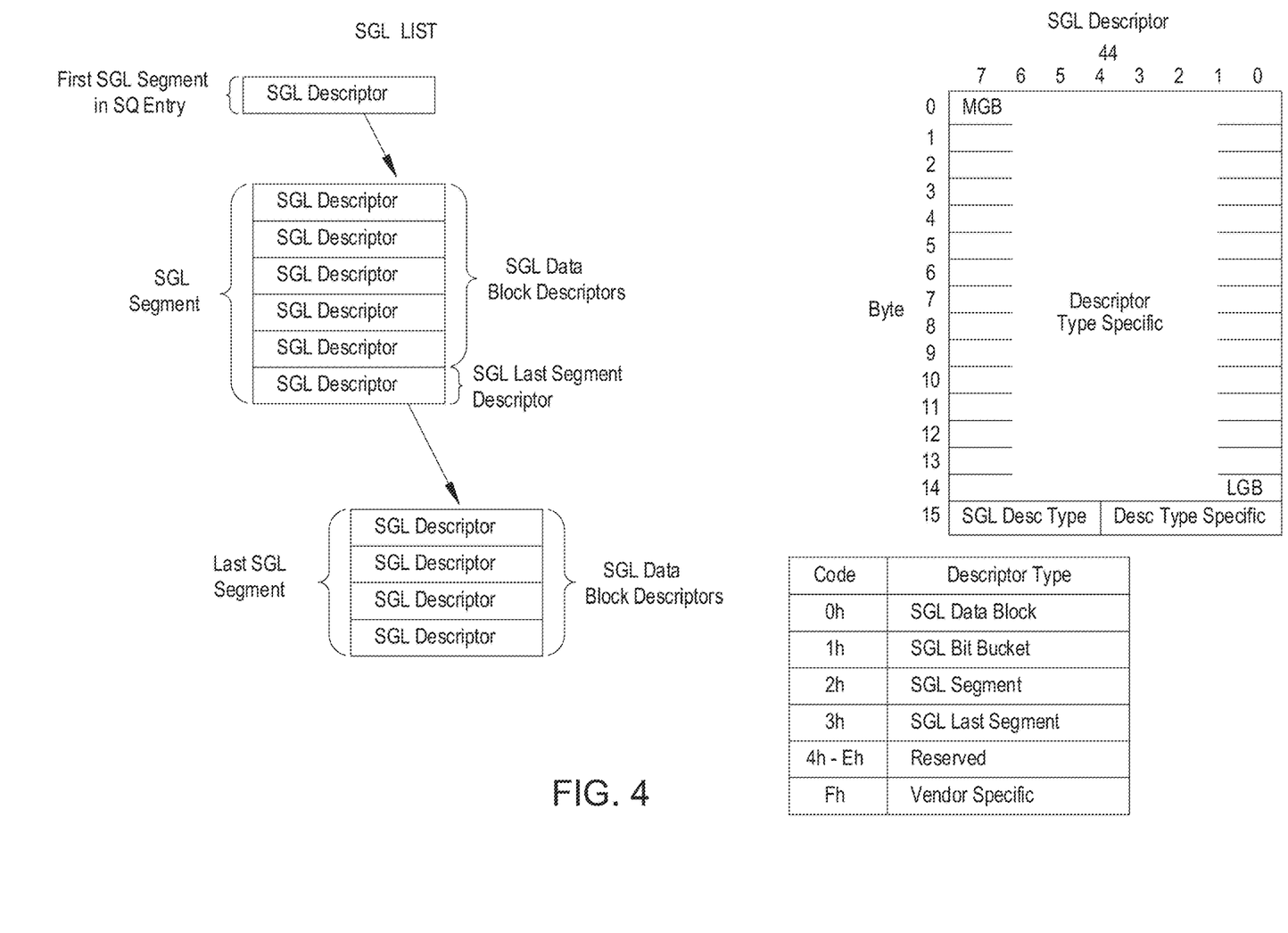
FIG. 4 is a schematic illustration of a SGL method according to one embodiment.

FIG. 4 is a schematic illustration of a SGL method according to one embodiment. The NVMe command contains an SGL segment descriptor which points to a bunch of SGL data block descriptors. The last descriptor in this chunk is an SGL last segment descriptor which points to the last bunch of SGL data block descriptors.

Figure 5:
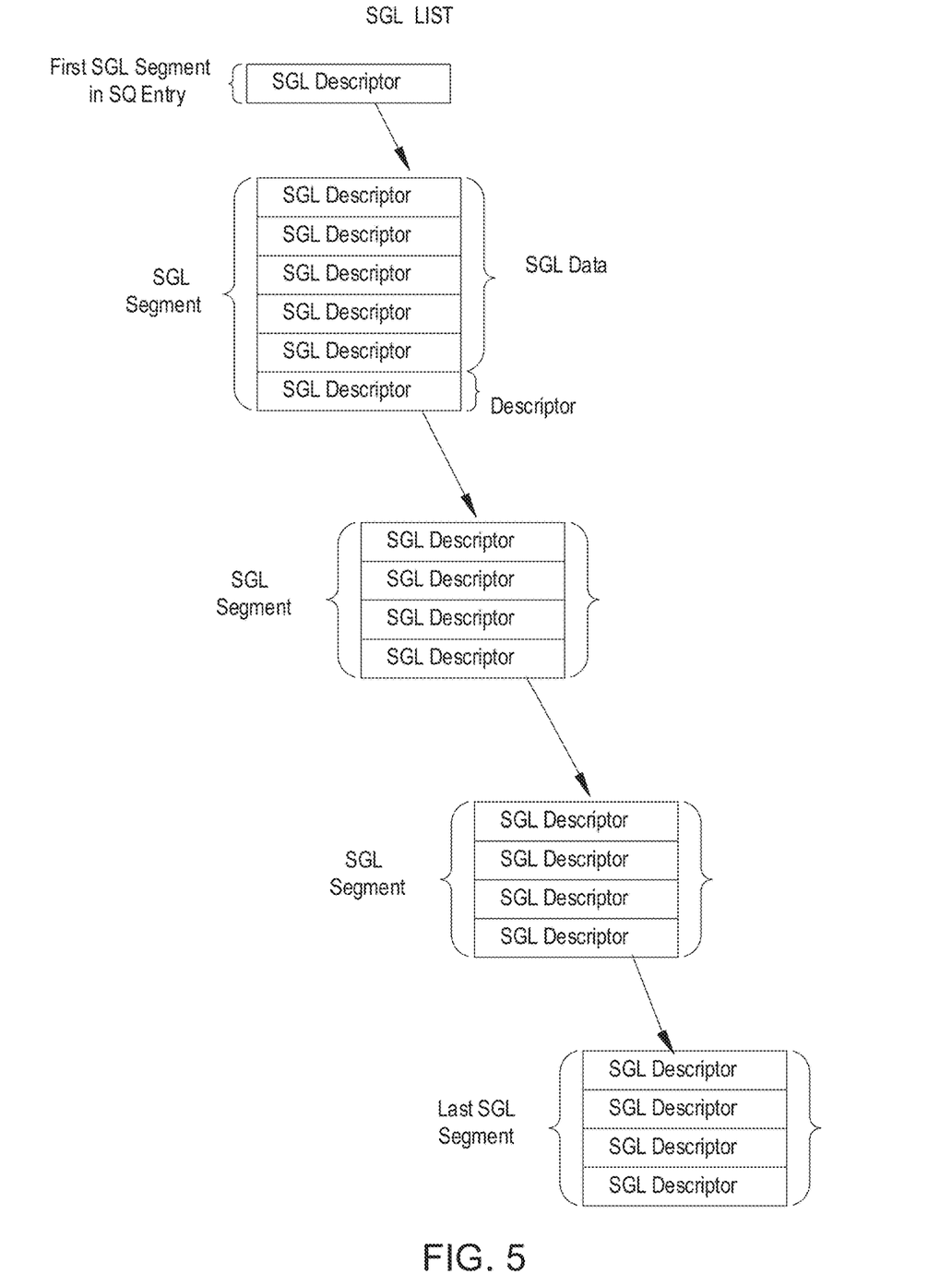
FIG. 5 is a schematic illustration of a SGL method according to one embodiment.

FIG. 5 is a schematic illustration of a SGL method according to one embodiment. The device comprises a way for reducing SGL fetching latency by having parallel fetching from multiple segments. Device controller fetches the SGL segment pointers in advance and maintains the pointers internally. Using the cached pointers, the device controller is able to have parallel SGL fetching from multiple segments. The concept increases the performance when having fragmented SGL (real customer workload).

As will be additionally discussed below, FIG. 5 shows an example of SGL usage. In this example, there are four SGL segments. Due to the out-of-order data transfer, device controller needs to fetch an SGL entry from the fourth SGL segment.

In the previous approach, the device first fetches the SGL entries from the first segment. After getting the last entry from the first segment, the device fetches the SGL entries from the second segment. Then, after getting the last entry from the second segment, the device fetches the SGL entries from the third segment until fetching the required SGL entry held in the fourth segment. The fetching in the example SGL fetching is done sequentially one by one since the pointer for the next SGL is stored in the last entry of the previous segment. The latency in this example would be at least four times host turnaround time.

The approach is not ideal for when the SGL descriptor in one of the later SGL segments. When the SGL descriptor is needed, the system must read through all prior SGL descriptors since the SGL pointer is that last SGL descriptor of each SGL segment. Since the pointer for the last descriptor must be read before reading the next SGL segment, the sequential fetching causes increased latency. The approach is not ideal for a SGL list with multiple SGL segments with needed SGL descriptors in the later SGL segments.

In the new approach discussed herein, each last entry from each segment is fetched in advance and is maintained internally. When a SGL descriptor from the fourth SGL segment is required, the logic goes directly and fetches the descriptor. When all SGL descriptors are required, the logic fetches in-parallel from multiple segments reducing the latency to one host turnaround time.

Furthermore, when the last entry from each segment is fetched in advance, the fetching allows the system to fetch all SGL descriptors in that SGL segment which allows for parallel fetching as needed. Parallel fetching avoids the previous approach of sequentially fetching the SGL descriptors. It is to be noted that parallel fetching is allowed even when crossing SGL segments. The system is now able to fetch SGL descriptors in later SGL segments without having to compromise latency when fetching the later SGL descriptors. The data storage device is able to fetch SGL descriptors in parallel because the SGL descriptors are all maintained internally for when needed.

Figure 6:
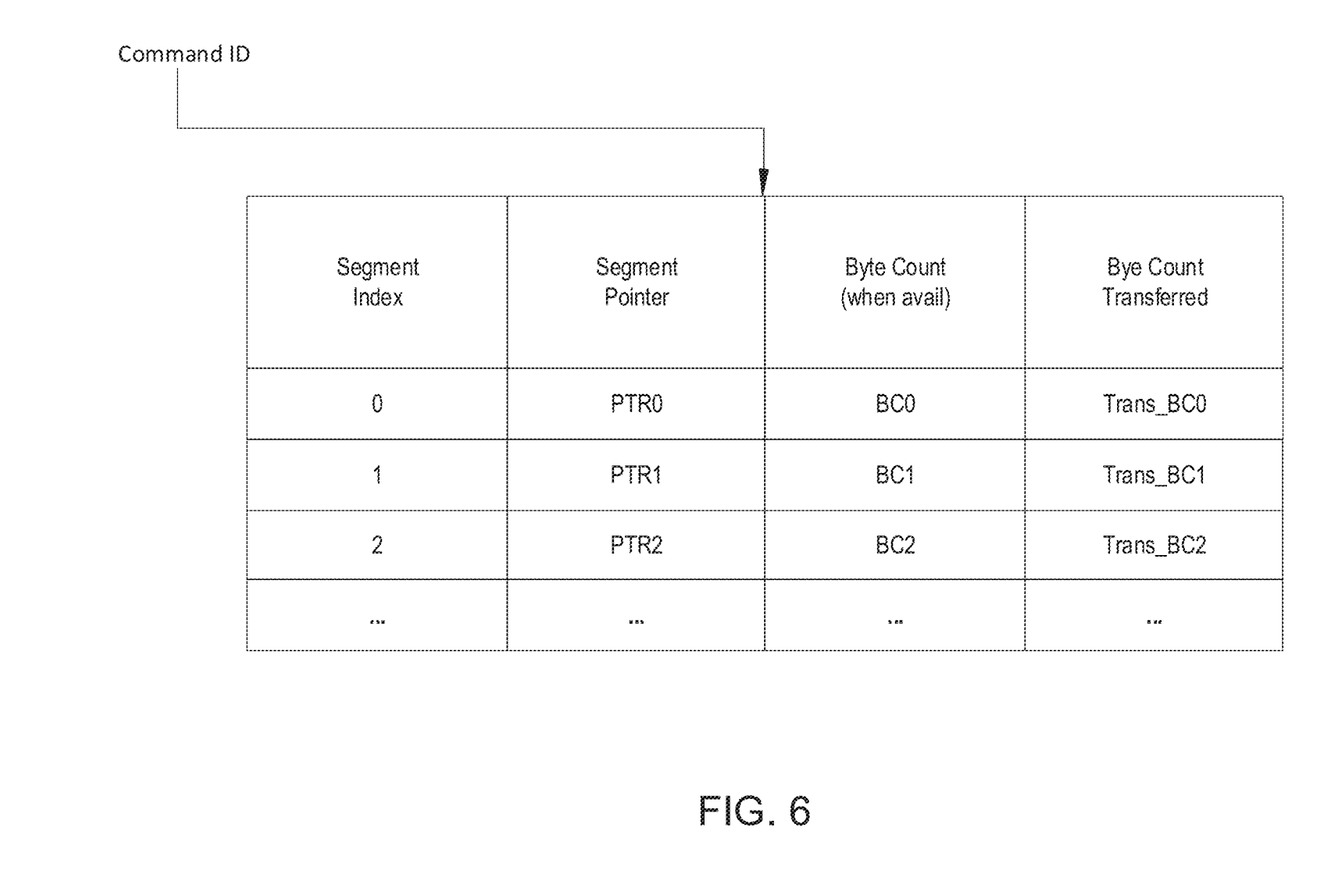
FIG. 6 is a table illustrating a SGL Segment Pointer Table according to certain embodiments.

FIG. 6 is a table illustrating a SGL Segment Pointer Table according to certain embodiments. The SGL Segment Pointer Table is maintained in the device controller. The table is allocated per outstanding command and holds the next segment pointers when available. The table also contains the counter of the data-transfer indicating the amount of data transferred for each. When completing the data transfer associated with a segment, the relevant pointer could be deleted, and the next pointer could be fetched from the host. When the byte count associated with each segment is provided by the host (currently the byte count is not), the byte count could be stored in the table and help in the fetching.

Once a SGL descriptor has been fetched based on the command, the SGL pointer can then be removed from the table to allow room for more SGL pointers to be stored through parallel fetching.

Figure 7A:
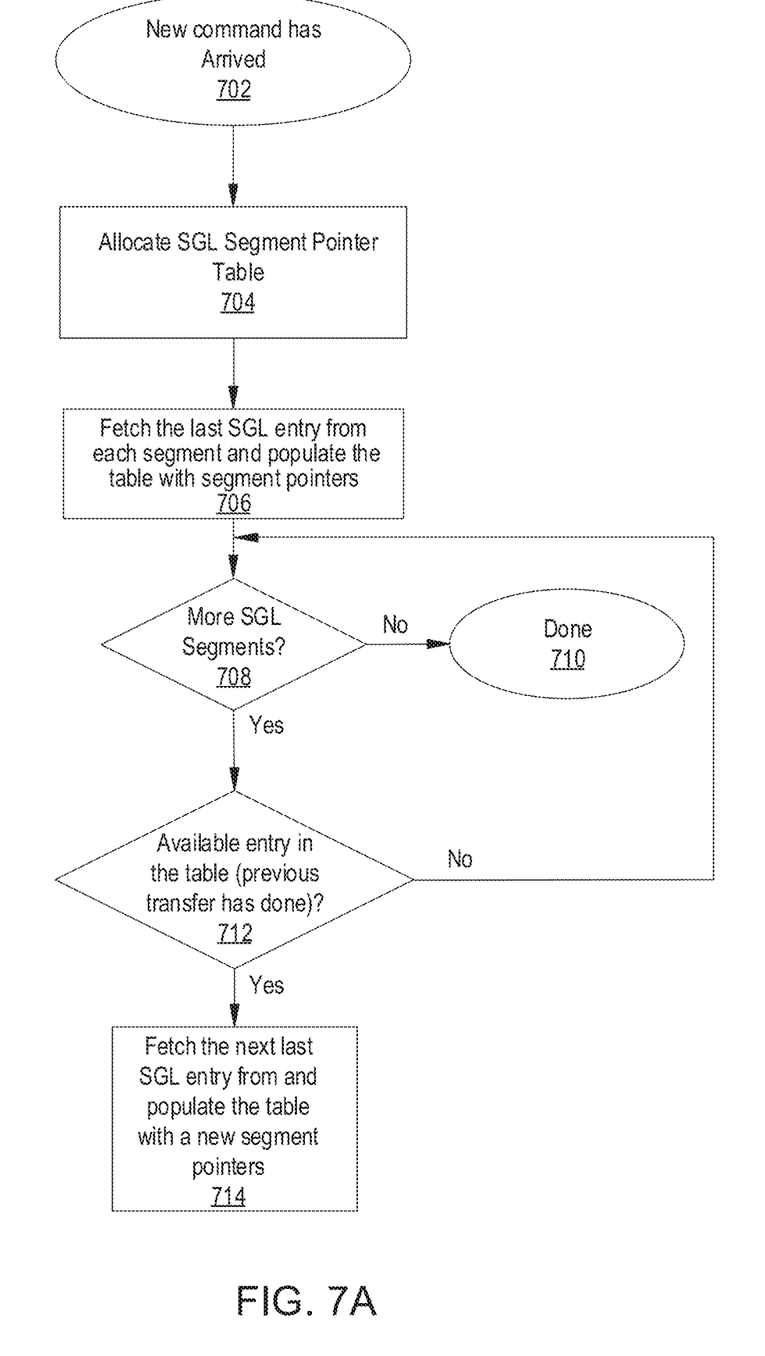
FIG. 7A is a flowchart illustrating SGL segment pointer fetching according to one embodiment.

FIG. 7A is a flowchart illustrating SGL segment pointer fetching according to one embodiment. The chart describes the SGL segment pointer fetching. The logic always fetches SGL segment pointers in advance and maintains the pointers internally.

In block 702 the system receives a new command from the host. The device then allocates the SGL Segment Pointer table in block 704. The process then proceeds to block 706 to fetch the last entry from each SGL segment and populate the table with the segment pointers. The last entry of a SGL segment will always point to the first entry of the next SGL segment if there is one available. The fetching of the either segment pointer or SGL pointers are fetched in parallel as discussed above. The fetching of all last SGL segments entries ensures that that system reduces latency through the sequential fetching of previous approaches. The data storage device in block 708 then has to determine if there are any more SGL segments that need to be fetched. If the answer is no then the process is done in block 710 until a SGL descriptor is needed from the host. If there are more SGL segments then the process continues to block 712 where the device has to determine if there is any available space in the table.

The amount of room is determined by how many SGL segments are already stored in the table and if any SGL segments have been deleted to make space available for additional SGL segments. If there is no available room in the table then the process must return to block 708. If there is room in the table for addition SGL segments then the process will continue to block 714 where the device fetches the last entry of said SGL segment or plurality of SGL segments to populate the table with the new segment pointers.

Figure 7B:
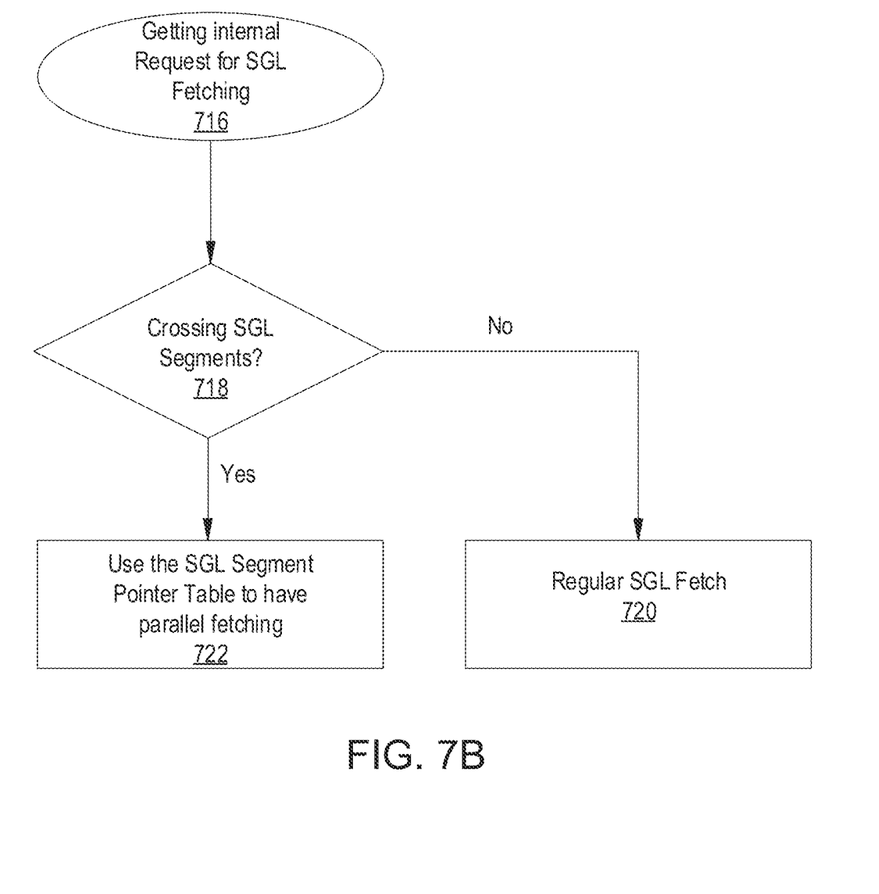
FIG. 7B is a flowchart illustrating SGL parallel fetching according to one embodiment.

FIG. 7B is a flowchart illustrating SGL parallel fetching according to one embodiment. The chart describes the usage of SGL pointers when SGL fetching is needed using the parallel fetching mechanism.

In block 716, the data storage device receives an internal request for SGL fetching. The data storage device then determines whether there are any crossing SGL segments.

Crossing SGL segments are SGL descriptors that are needed by the host device and are in different SGL segments. If there are no crossing SGL segments then the process will proceed to block 720 where regular SGL fetching will occur. Regular SGL fetching will be sequentially fetching SGL descriptors in the order that are in the SGL list. If there are crossing SGL segments, then the process will proceed to block 722 where the data storage device will use the SGL segment pointer table to enable parallel fetching.

Figure 8:
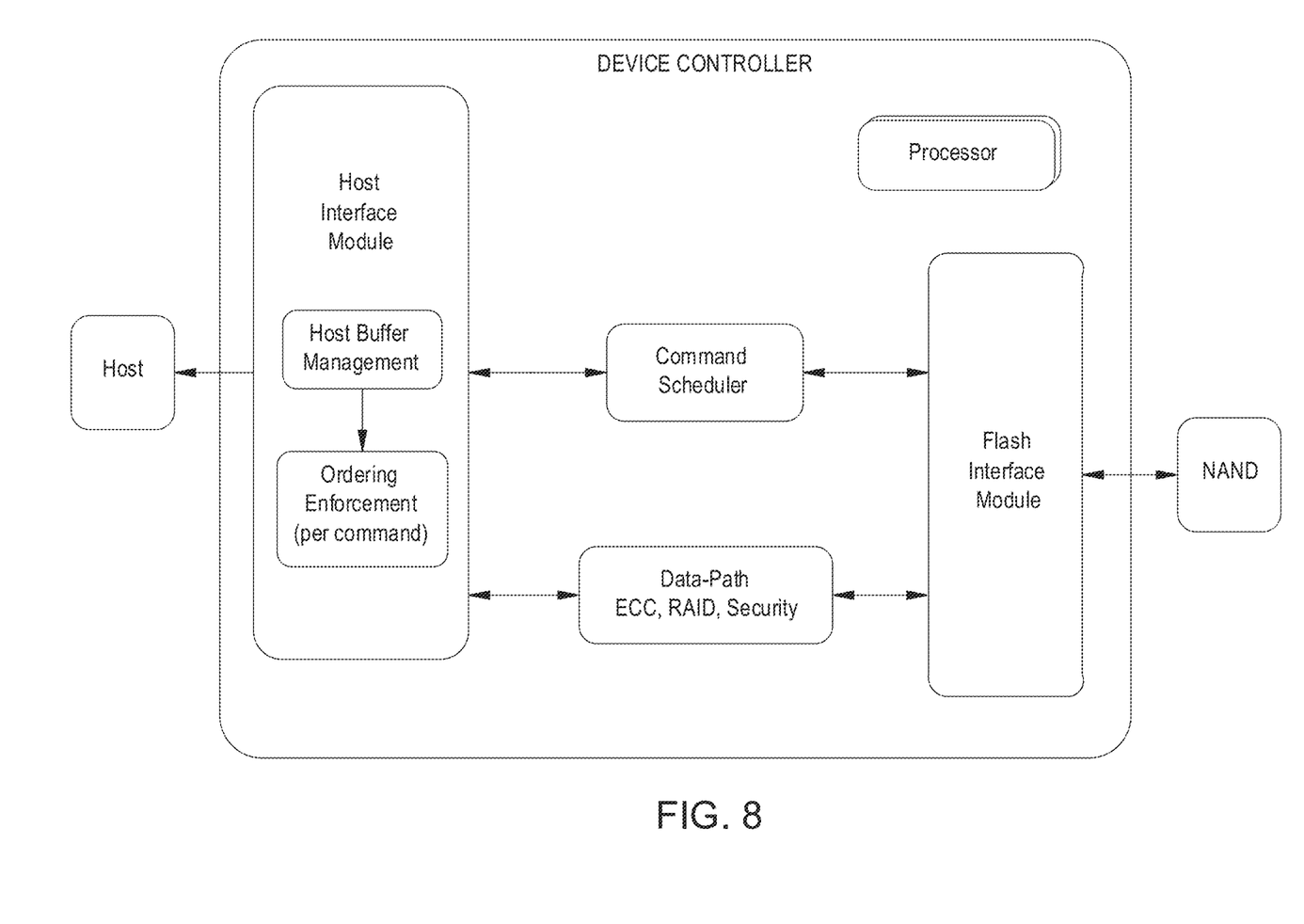
FIG. 8 is a high level block diagram of a storage system according to one embodiment.

FIG. 8 is a high level block diagram of a storage system according to one embodiment. As shown in FIG. 8, a host buffer manager and an ordering enforcement (per command) module are disposed in the host interface module (HIM). The host buffer manager is responsible for fetching the host buffers for all commands. Based on the first host buffers fetched for a command, the command is classified and the order rules for the data transfer are set. Both the command scheduler and the ordering enforcement module receive the decision and act accordingly. In one embodiment, the order enforcement module and the host buffer manager are logic. The command scheduler limits the sense requests towards the flash interface module (FIM) and the ordering enforcement module reorder the transfer accordingly. The host buffer management fetches the last entries in each segment ahead of time and maintains the pointers in the SGL Segment Pointer Table. The operation enables the parallel fetching from different segments when required and reduces the latency by limiting the fetching for a single host device turn around time.

In yet another embodiment, each last entry on a segment contains the total byte count described in the next segment. The information will be maintained in the SGL Segment Pointer Table. The device controller uses the information for having out-of-order SGL fetching which will increase the efficiency and reduce the die area.

In yet another embodiment, the separate fetching of the last entry of each segment is not implemented. However, the fetching order within a segment is done out-of-order. First, the logic fetches the entries that contain the last entry and only then the previous entries. The approach will allow the logic to first get the next pointer and start fetching the next segment immediately.

Figure 9:
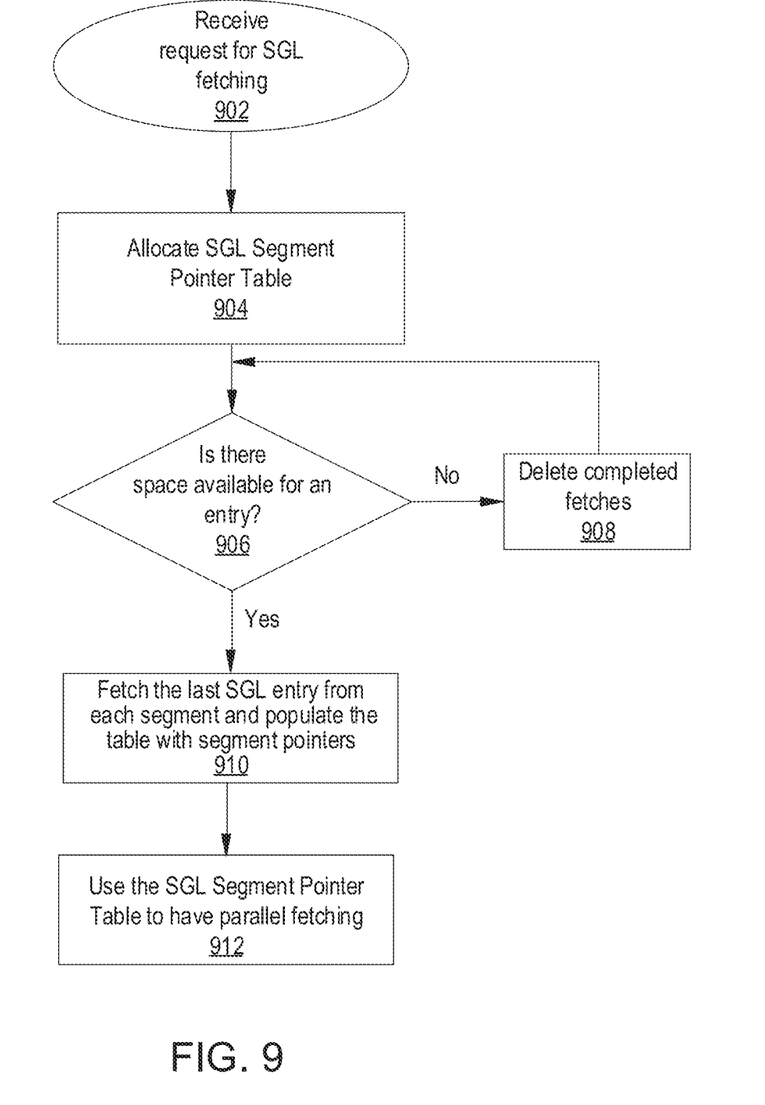
FIG. 9 is a flowchart illustrating SGL parallel fetching according to one embodiment.

FIG. 9 is a flowchart illustrating SGL parallel fetching according to one embodiment. Initially, a request for SGL fetching is initially received at 902 followed by allocating an SGL segment pointer table at 904. A determination is made at 906 regarding whether there is space available in the table for an entry. If there is no space available, then the data storage device can delete any completed fetches at 908 and then re-determine whether there is any available space in the table at 906. If there is space available at 908, then the last SGL entry from each segment is fetched and populated into the table with the corresponding segment pointers at 910. The SGL segment pointer table is then used for parallel fetching at 912.

By performing parallel fetching of the last pointer in SGL segments, the capability that the device controller could hide the host device turn-around time when having fragmented SGLs. The final results could be observed in the overall random and sequential performance.

In one embodiment, a data storage device comprises: a memory device; and a controller coupled to the memory device, wherein the controller is configured to: receive a command, wherein the command comprises a scatter-gather list (SGL), wherein the SGL includes at least two segments, and wherein the at least two segments each includes a plurality of entries; and retrieve a last entry of the plurality of entries the at least two segments, wherein the last entry is retrieved prior to retrieval of at least one other entry of the plurality of entries. The last entry, upon retrieval, is stored in a table. The last entry is deleted from the table after data corresponding to the last entry has been retrieved. The controller is further configured to determine whether the table has available space for another last entry. The table has available space once a previous transfer has completed and a different last entry listed in the table can be deleted. The controller is configured to fetch another last entry from another segment and populate the table with new segment pointers. The controller is configured to retrieve a last entry of each segment of the at least two segments. The data associated with the plurality of entries is retrieved in parallel with retrieving the last entries. The controller is configured to receive an internal request for SGL fetching. The controller is further configured to determine whether there are any crossing SGL segments. The controller is further configured to use a SGL segment pointer table to proceed with parallel fetching.

In another embodiment, a data storage device comprises: a memory device; and a controller coupled to the memory device, wherein the controller includes: receiving an internal request for scatter-gather list (SGL) fetching; determine that there are crossing SGL segments; and parallel fetch data for crossing SGL segments. The controller is further configured to update a pointer table to remove an SGL pointer upon fetching data associated with the pointer. Parallel fetching comprises fetching data associated with SGL pointers that are in different segments. Parallel fetching comprises fetching data associated with a last SGL descriptor of a SGL segment while in parallel fetching data associated with another SGL descriptor of the segment. The controller comprises a host interface module (HIM) that includes a host buffer manager and a scatter-gather list (SGL) segment pointer table. The controller is further configured to allowance the segment pointer table on a per command basis.

In another embodiment, a data storage device comprises: memory means; and a controller coupled to the memory means, wherein the controller is configured to: fetch scatter-gather list (SGL) entries out of order from SGL segments in an SGL list; and fetch data associated with the SGL entries in parallel. Fetching SGL entries out of order comprises fetching last entries of each SGL segment prior to fetching all other entries of each SGL segment. The controller is further configured to store the last entries in a SGL table maintained within the controller.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
receive a command, wherein the command comprises a scatter-gather list (SGL), wherein the SGL includes at least two segments, and wherein the at least two segments each includes a plurality of entries; and
retrieve a last entry of the plurality of entries of the at least two segments, wherein the retrieval is out of order, wherein the last entry is retrieved prior to retrieval of at least one other entry of the plurality of entries and before read data is available, wherein the read data is data corresponding to the command.

2. The data storage device of claim 1, wherein the last entry, upon retrieval, is stored in a table.

3. The data storage device of claim 2, wherein the last entry is deleted from the table after data corresponding to the last entry has been retrieved.

4. The data storage device of claim 2, wherein the controller is further configured to determine whether the table has available space for another last entry.

5. The data storage device of claim 4, wherein the table has available space once a previous transfer has completed and a different last entry listed in the table can be deleted.

6. The data storage device of claim 5, wherein the controller is configured to fetch another last entry from another segment and populate the table with new segment pointers.

7. The data storage device of claim 1, wherein the controller is configured to retrieve a last entry of each segment of the at least two segments.

8. The data storage device of claim 7, wherein data associated with the plurality of entries is retrieved in parallel with retrieving the last entries.

9. The data storage device of claim 1, wherein the controller is configured to receive an internal request for SGL fetching.

10. The data storage device of claim 9, wherein the controller is further configured to determine whether there are any crossing SGL segments.

11. The data storage device of claim 10, wherein the controller is further configured to use a SGL segment pointer table to proceed with parallel fetching.

12. A data storage device, comprising:
a memory device; and
a controller coupled to the memory device, wherein the controller includes:
receiving an internal request for scatter-gather list (SGL) fetching;
determine that there are crossing SGL segments; and
parallel fetch data for crossing SGL segments before read data is available, wherein the read data is data corresponding to the SGL segments, wherein SGL segments entries are retrieved out of order.

13. The data storage device of claim 12, wherein the controller is further configured to update a pointer table to remove an SGL pointer upon fetching data associated with the pointer.

14. The data storage device of claim 12, wherein parallel fetching comprises fetching data associated with SGL pointers that are in different segments.

15. The data storage device of claim 12, wherein parallel fetching comprises fetching data associated with a last SGL descriptor of a SGL segment while in parallel fetching data associated with another SGL descriptor of the segment.

16. The data storage device of claim 12, wherein the controller comprises a host interface module (HIM) that includes a host buffer manager and a scatter-gather list (SGL) segment pointer table.

17. The data storage device of claim 16, wherein the controller is further configured to allowance the segment pointer table on a per command basis.

18. A data storage device, comprising:
memory means; and
a controller coupled to the memory means, wherein the controller is configured to:
fetch scatter-gather list (SGL) entries out of order from SGL segments in an SGL list; and
fetch data associated with the SGL entries in parallel before read data is available.

19. The data storage device of claim 18, wherein fetching SGL entries out of order comprises fetching last entries of each SGL segment prior to fetching all other entries of each SGL segment.

20. The data storage device of claim 19, wherein the controller is further configured to store the last entries in a SGL table maintained within the controller.

* * * * *